United States Patent
Okamura et al.

(10) Patent No.: US 7,199,537 B2
(45) Date of Patent: Apr. 3, 2007

(54) VOLTAGE CONVERTER CONTROL APPARATUS, AND METHOD

(75) Inventors: Masaki Okamura, Toyota (JP); Eiji Sato, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 142 days.

(21) Appl. No.: 10/500,041

(22) PCT Filed: Jan. 14, 2003

(86) PCT No.: PCT/JP03/00192

§ 371 (c)(1),
(2), (4) Date: Jun. 23, 2004

(87) PCT Pub. No.: WO03/061104

PCT Pub. Date: Jul. 24, 2003

(65) Prior Publication Data
US 2005/0067999 A1    Mar. 31, 2005

(30) Foreign Application Priority Data
Jan. 14, 2003 (JP) ............................ 2002-007960

(51) Int. Cl.
*H02M 3/18* (2006.01)
*H01L 31/04* (2006.01)
*H02J 1/00* (2006.01)
*G05F 1/66* (2006.01)

(52) U.S. Cl. .................... 318/139; 318/812; 320/140; 320/149; 324/430; 324/433; 363/74; 363/80

(58) Field of Classification Search .................... None
See application file for complete search history.

(56) References Cited

U.S. PATENT DOCUMENTS 6,031,359 A * 2/2000 Michelsen et al. .......... 320/141

(Continued)

FOREIGN PATENT DOCUMENTS

DE      41 14 617 C1    10/1992

(Continued)

OTHER PUBLICATIONS

European Search Report, Appln. No. 03700550.1—2207, issued Mar. 1, 2006.

*Primary Examiner*—Lincoln Donovan
*Assistant Examiner*—Eduardo Colon Santana
(74) *Attorney, Agent, or Firm*—Kenyon & Kenyon LLP

(57) ABSTRACT

By using a target voltage Vc* of a capacitor connected to the output side of a DC/DC converter and a voltage Vb of a battery connected to the input side of the DC/DC converter, a duty ratio D as a drive instruction of the DC/DC converter is calculated. By using the voltage Vb, the electromotive force Vbo of the battery, and the charge/discharge current Ib of the battery, an internal resistance Rb is calculated. According to the internal resistance Rb and the electromotive force Vbo, the current value when the battery output becomes maximum is set as the upper limit value of the optimal current range IR, the DC/DC converter is driven/controlled by limiting the duty ratio D so that the current Ib is within the range of the optimal current range IR. Thus, it is possible to appropriately convert the battery input voltage.

22 Claims, 14 Drawing Sheets

U.S. PATENT DOCUMENTS

| | | | |
|---|---|---|---|
| 6,297,616 B1* | 10/2001 | Kubo et al. | 320/116 |
| 6,696,818 B2* | 2/2004 | Arai et al. | 320/132 |
| 2001/0053950 A1 | 12/2001 | Hasegawa et al. | |
| 2004/0178773 A1* | 9/2004 | Eguchi et al. | 320/140 |
| 2005/0097701 A1* | 5/2005 | Kushida et al. | 15/319 |
| 2005/0173985 A1* | 8/2005 | Eguchi et al. | 307/10.1 |
| 2005/0218876 A1* | 10/2005 | Nino | 323/282 |

FOREIGN PATENT DOCUMENTS

| | | |
|---|---|---|
| EP | 1 030 431 | 8/2000 |
| EP | 1 030 431 A | 8/2000 |
| JP | 5-260610 | 10/1993 |
| JP | 6-066204 | 9/1994 |
| JP | 8-098419 | 4/1996 |
| JP | 8-214592 | 8/1996 |
| JP | 9-073328 | 3/1997 |
| JP | 09073328 A * | 3/1997 |
| JP | 11-259190 | 9/1999 |
| JP | 2000-308348 | 11/2000 |
| JP | 2000-308348 A | 11/2000 |
| JP | 2001-211560 | 8/2001 |
| JP | 2001-275367 | 10/2001 |
| WO | WO 99/52168 A | 10/1999 |

* cited by examiner (a)

(b)

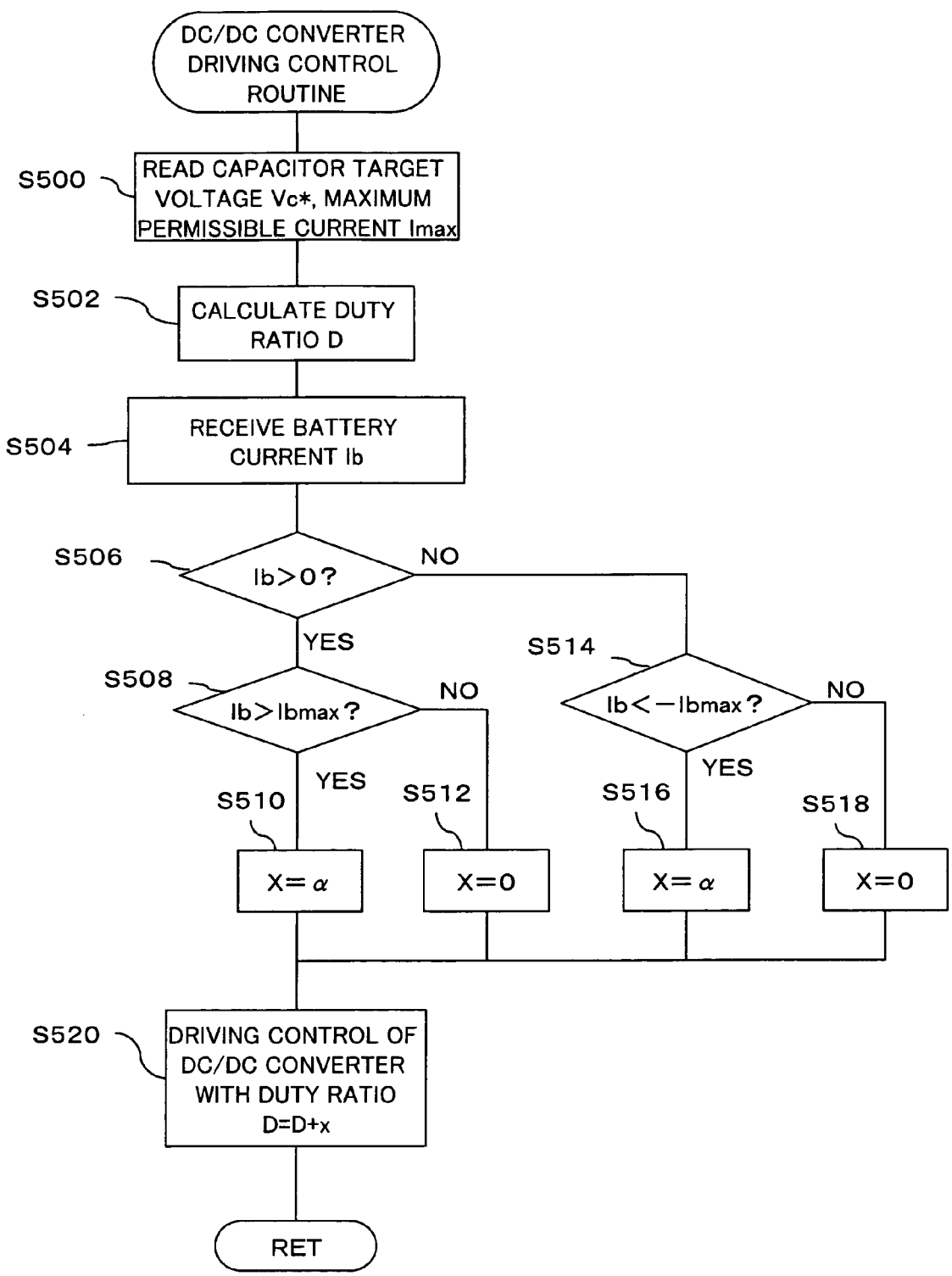

VOLTAGE CONVERTER CONTROL APPARATUS, AND METHOD

This is a 371 application of PCT/JP03/00192 filed 14 Jan. 2003, which claims priority to Japanese patent application No. 2002-007960 filed 16 Jan. 2002, the contents of which are incorporated herein by reference in their entirety.

TECHNICAL FIELD

The present invention relates to a control device and a voltage conversion method for a voltage conversion device, a recording medium, a program, a driving system, and a vehicle carrying the driving system. In particular, the present invention relates to a device having a reactor for temporary storage of energy based on a current from a power source, for converting a voltage of the power source, which is input using the reactor, into a desired voltage through switching of a switching element to output.

BACKGROUND ART

As a conventional driving system of the above-described kind, there is proposed a system comprising, for example, a battery serving as a power source of the driving system, a DC/DC converter for applying DC/DC conversion to an input voltage from the battery, a load having an inverter for converting an output from the DC/DC converter into a multi-phase AC current and a motor for rotation driving while receiving the multi-phase AC current from the converter, and a capacitor arranged between the DC/DC converter and the load and connected to the positive and negative bussbars (lines) of the inverter circuit. In such a system, the DC/DC converter applies DC/DC conversion to an input voltage from the battery and the converted voltage is then stored in the capacitor so that the load is driven using the power-stored capacitor then considered as a DC power source.

In this system, while driving control of a DC/DC converter is performed such that the amount of power corresponding to an output required by a load, or "a load requiring output", can be obtained from the battery, the voltage stored in the capacitor can remain in a stable condition while the driving system can achieve stable driving. General batteries are designed to be capable of supplying an amount of power corresponding to a load requiring output. However, there may be situations in which, depending on the condition of the battery, a battery cannot supply an amount of power corresponding to a load requiring output when, for example, the battery inner resistance has increased due to low battery temperature. Were the DC/DC converter be, in such a case, given driving control simply such that an amount of power corresponding to a load requiring output is fed to the load, power consumption due to inner resistance of the battery may increase, resulting in a drop in power supplied to the load.

DISCLOSURE OF INVENTION

Control by a voltage conversion device of the present invention enables more appropriate conversion of an input voltage from a power source depending on the condition of the power source.

Specifically, with control by a voltage conversion device according to one aspect of the present invention, a current range setting means sets a range of current from a power source based on output characteristics of the power source corresponding to the condition of the power source, which is determined by a condition detection means, and a control means controls switching of a switching element such that the current from the power source remains in the current range set by the current range setting means. This arrangement enables more appropriate extraction of an output from the power source based on the output characteristics of the power source corresponding to the condition of the power source. Here, "output characteristic of a power source" refers to correlation between an output and a current from the power source.

With control by a voltage conversion device according to another aspect of the present invention, a ratio range setting means sets a range of ratios each between a period with an upper switching element remaining in an ON state and a period with a lower switching element remaining in an ON state, or a ratio range, based on output characteristics of the power source corresponding to the condition of the power source, which is determined by the condition detection means, and a control means controls the ratio between the periods with the respective switching elements remaining in an ON state so as to remain within the ratio range set by the ratio range setting means. This arrangement enables more appropriate extraction of an output from the power source based on the output characteristics of the power source depending on the condition of the power source. Here, "output characteristics of a power source" refers to correlation between an output of the power source and a ratio between periods with the respective switching elements remaining in an ON state.

With control by a voltage conversion device according to another aspect of the present invention, the control means controls switching of a switching element such that the voltage of the power source, which is detected by the voltage detection means, remains in a predetermined range. Monitoring the condition of the power source by monitoring its voltage enables more appropriate extraction of an output from the power source.

BRIEF DESCRIPTION OF DRAWINGS

FIG. 14 is a flowchart of an exemplary DC/DC converter driving control routine to be executed by the electronic control unit 40 of the drive system in the embodiment.

BEST MODE FOR CARRYING OUT THE INVENTION

In the following, embodiments of the present invention will be described.

Figure 1:
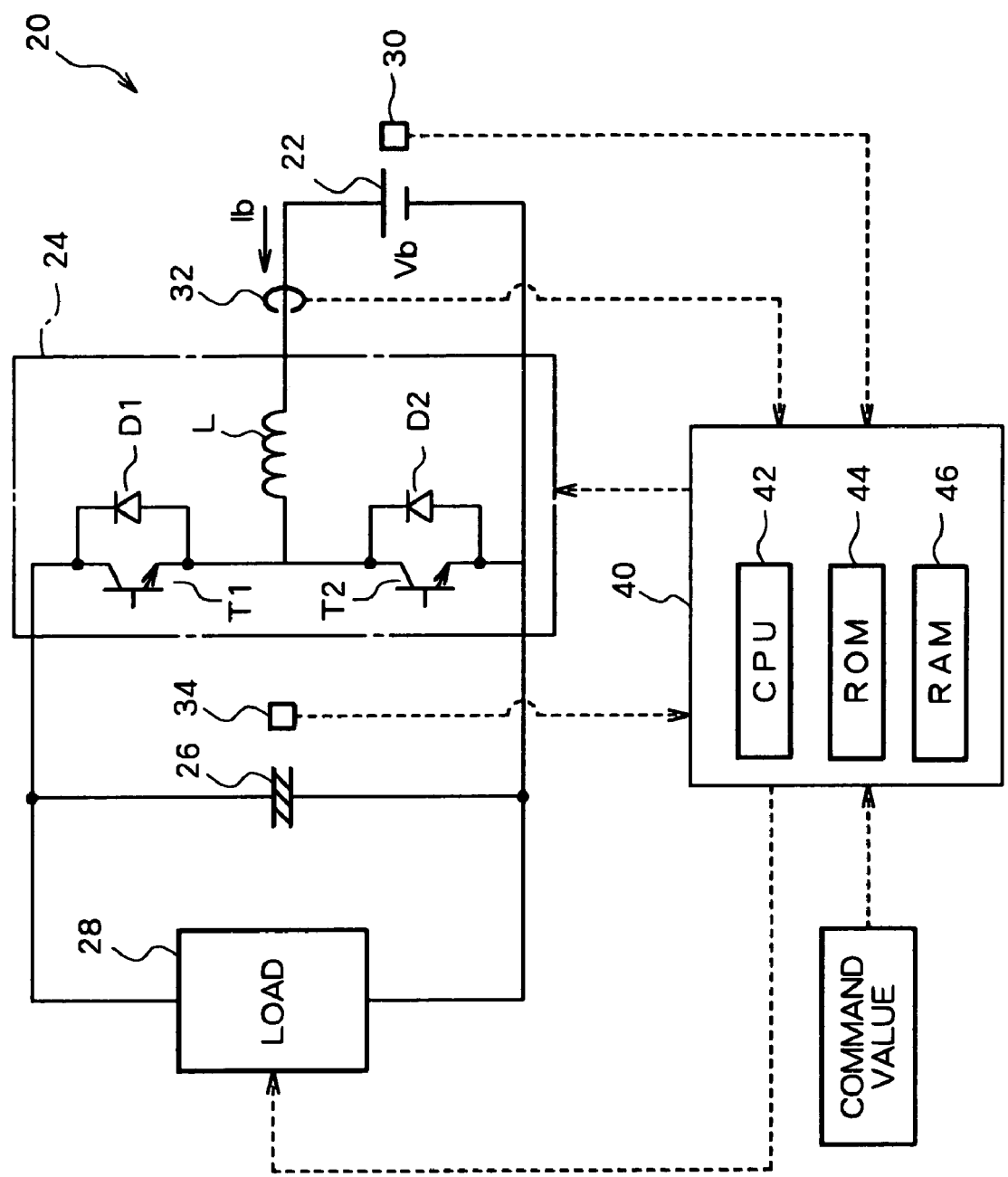
FIG. 1 is a block diagram schematically showing a structure of a driving system 20 according to one embodiment of the present invention.

FIG. 1 is a schematic diagram showing a structure of a driving system 20 in an embodiment of the present invention of the present invention. The driving system 20 in the embodiment comprises, as shown, a battery 22, a DC/DC converter 24 serving as a voltage conversion device for applying DC/DC conversion to an input voltage from the battery 22 to output, a capacitor 26 adapted to storing an output current from the DC/DC converter 24, a load 28 adapted to being driven using a stored current in the capacitor 26, and an electronic control unit 40 for controlling the entire device.

The battery 22 may be prepared, for example, as a secondary battery of nickel hydrogen or lithium ion.

The DC/DC converter 24 comprises two serially connected transistors T1, T2, two diodes D1, D2, and a reactor L, in which the two transistors T1, T2 are respectively connected to the positive and negative lines and on the source and sink sides of the load 28; the two diodes D1, D2 are reverse parallel connected to the transistors T1, T2, respectively; and the reactor L is connected to a point at which connecting the transistors T1, T2.

In the DC/DC converter 24, when the transistor T2 is turned on, a short circuit is formed connecting the battery 22, the reactor L, and the transistor T2, so that energy according to a DC current flowing from the battery 22 is stored in the reactor L. When the transistor T2 is then turned off, the energy stored in the reactor L is then stored in the capacitor 26 via the diode D1. In the above, the voltage of the capacitor 26 can become higher than a voltage fed by the battery 22. In this DC/DC converter 24, it is also possible to charge the battery 22 using stored charge in the capacitor 26. In this sense, the DC/DC converter 24 constitutes an elevating/descending voltage chopper circuit which can charge the capacitor 26 through turning on/off of the transistors T1, T2 and also charge the battery using stored charge in the capacitor 26. It should be noted that the reactor of the DC/DC converter 24 may employ a coil.

Figure 2:
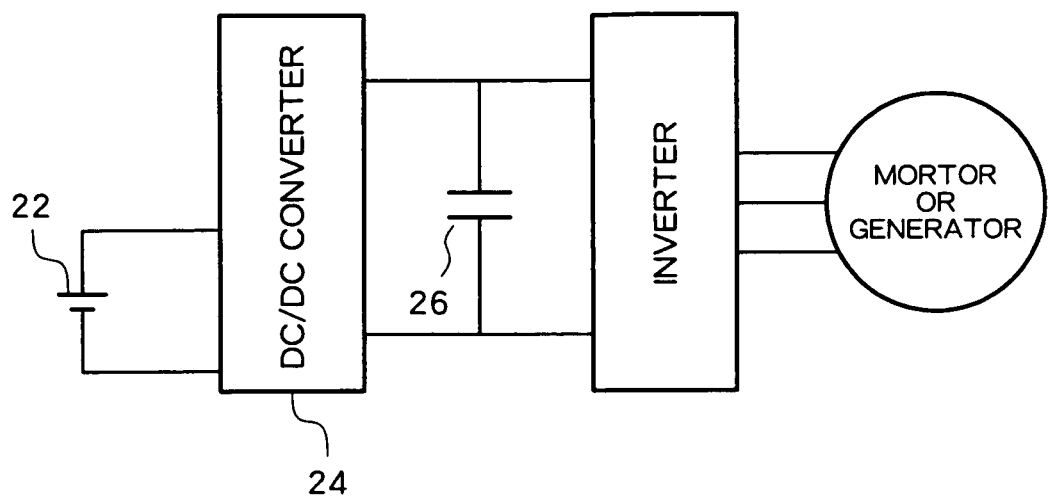
FIG. 2 is a diagram showing an example of the driving system 20.
Figure 2:
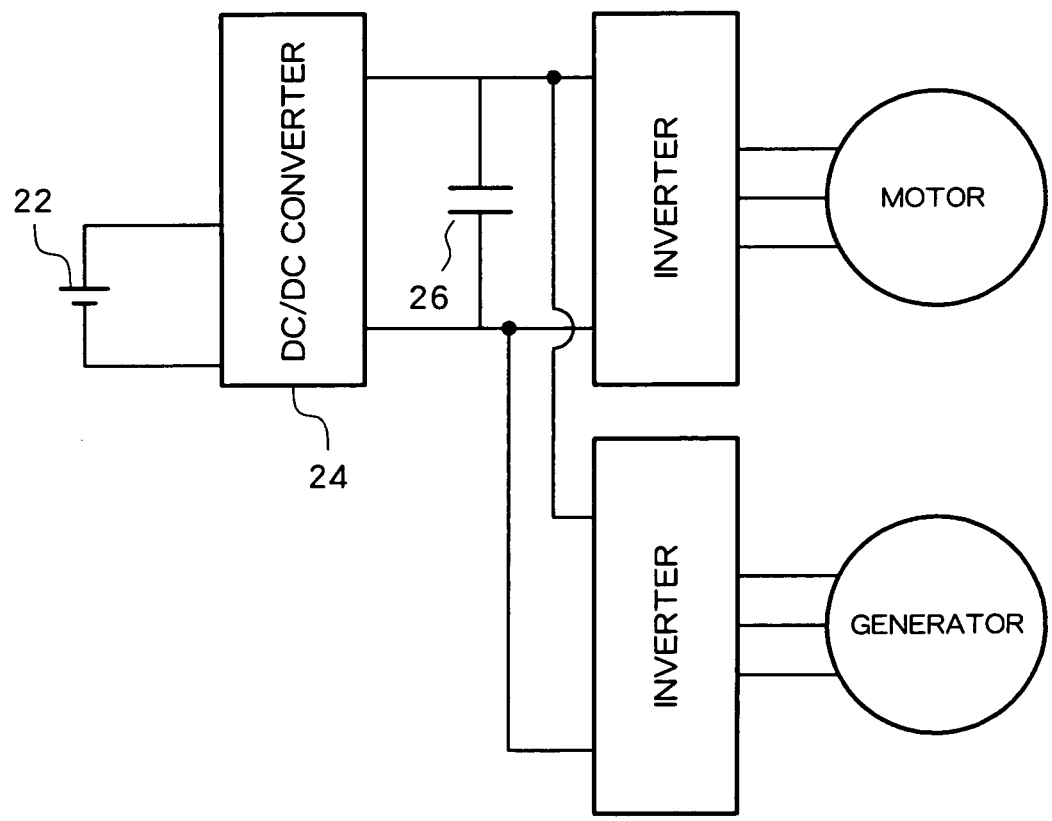

The load 28 may have a structure, as shown in FIG. 2, for example, comprising an inverter and a generator or a motor as mounted in an electric and/or hybrid vehicle (see FIG. 2(a)) or a structure comprising two parallel connected inverters respectively connected to a motor and a generator (see FIG. 2(b)), though the motor or generator as mounted to an electric or hybrid vehicle is not an exclusive example and any electric device which can be driven using power from the battery 22 is also applicable.

The electronic control unit 40 is constructed as a micro processor having a CPU 42 as a main component, as shown in FIG. 1, and comprising a ROM 44 for storing a process program, a RAM 46 for temporal data storage, and input/output ports (not shown). The electronic control unit 40 receives via an input port a battery voltage Vb from a voltage sensor 30 mounted to the battery 22, a battery current Ib from a current sensor 32 mounted to a power line connecting the battery 22 and the DC/DC converter 24, a capacitor voltage Vc from a voltage sensor 34 mounted to the capacitor 26, and a command value concerning driving of the load 28. Meanwhile, the electronic control unit 40 outputs, via an output port, a switching control signal to the transistors T1, T2 of the DC/DC converter 24 and a driving control signal to the load 28.

Operation of the thus structured driving system 20 of the embodiment, in particular, driving control of the DC/DC converter 24, will be described.

Figure 3:
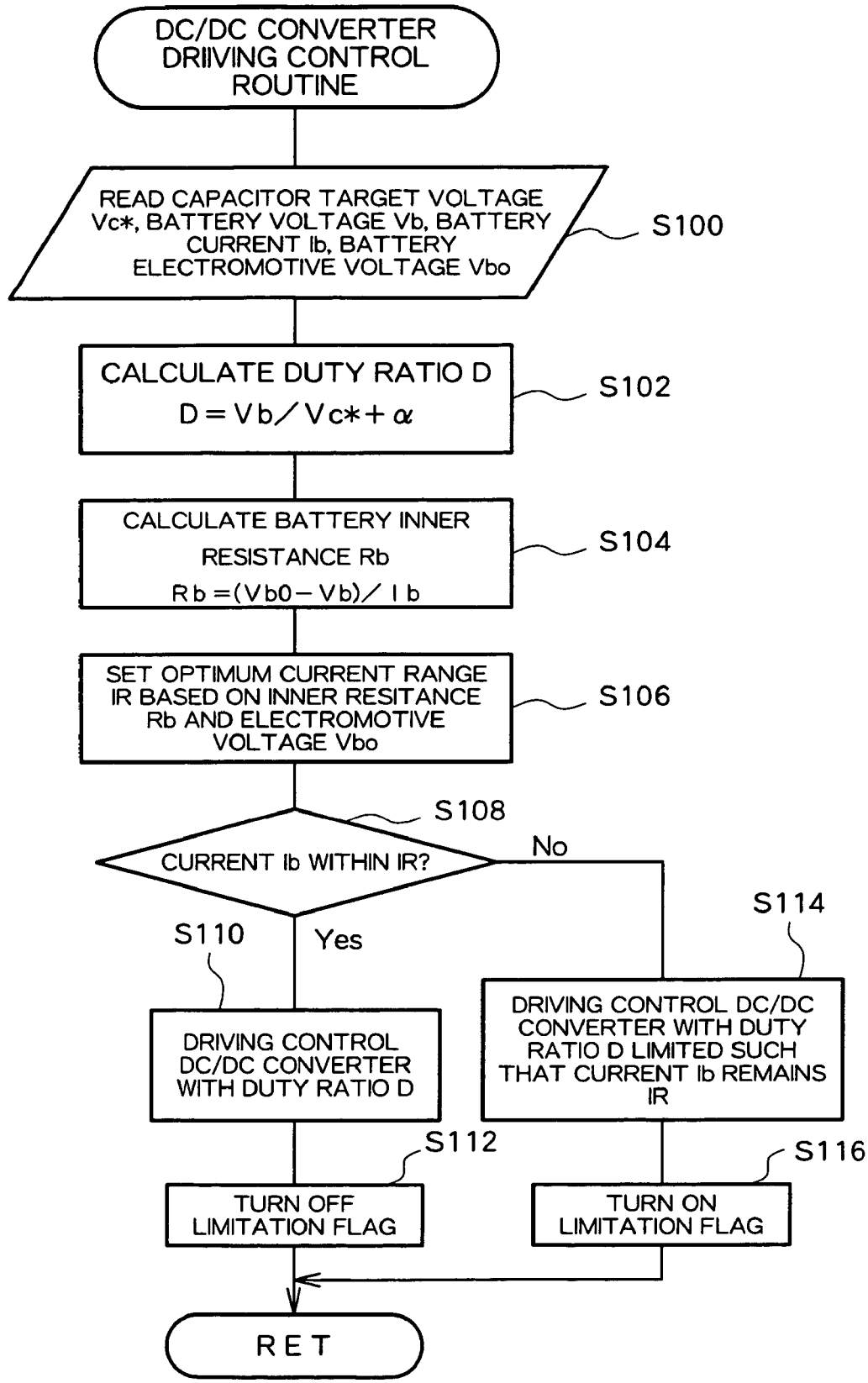
FIG. 3 is a flowchart of an exemplary DC/DC converter driving control routine to be executed by an electronic control unit 40 of the driving system 20 in the embodiment.

FIG. 3 is a flowchart of an example of a DC/DC converter driving control routine to be executed by the electronic control unit 40 of the driving system 20 in the embodiment. This routine is repetitively performed at predetermined intervals of time (for example, 0.2 msec).

Specifically, upon start of the DC/DC converter driving control routine, the CPU 42 of the electronic control unit 40 reads information concerning condition of the battery 22, including a capacitor target voltage Vc*, a battery voltage Vb from the voltage sensor 30, a battery current Ib from the current sensor 32, and a battery electromotive voltage Vbo (S100). Here, a capacitor target voltage Vc* is determined based on a required output P which serves as a command value concerning driving of the load 28, in other words, determined as a voltage of the capacitor 26 necessary in driving the load 28 using an amount of output equal to a required output P. A battery electromotive voltage Vbo exhibits a substantially constant voltage value even though the temperature or current of the battery 22 should change and is preset as a constant in the embodiment. It should be noted that, as a battery electromotive voltage Vbo, a battery voltage Vb with the battery current Ib being 0 may be measured using a voltage sensor and stored in the RAM 46 or the like.

After the reading of the information concerning condition of the battery 22, a ratio between a period with the upper transistor T1 remaining in an ON state (T1on) and that with the lower transistor T2 remaining in an ON state (T2on), or a duty ratio D, is calculated as "T1on/(T1on+T2on)" based on the read capacitor target voltage Vc* and battery voltage Vb and using the expression (1) below wherein α corresponds to correction of the duty ratio D.

$$D = Vb/Vc^* + \alpha \quad (1)$$

Subsequently, internal resistance Rb of the battery is calculated based on the read battery voltage Vb, battery electromotive voltage Vbo, and battery current Ib (step S104).

$$Rb = (Vbo - Vb)/Ib \quad (2)$$

Figure 4:
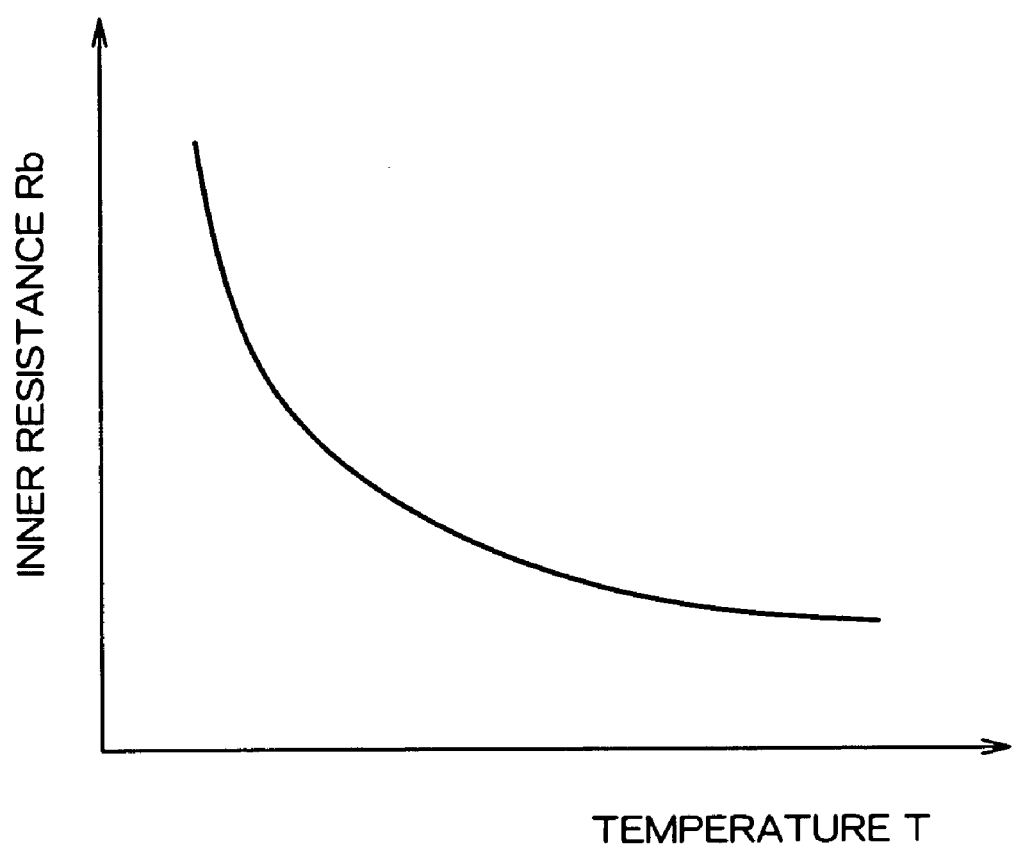
FIG. 4 is a map illustrating relationship between inner resistance Rb and temperature of a battery 22.

Although the inner resistance Rb of the battery 22 is obtained using the above expression (2) in this embodiment, the inner resistance may be obtained based on the temperature of the battery 22. For example, correlation between the inner resistance Rb and temperature of the battery 22 may be obtained in advance in an experiment and stored in the form of a map in the ROM 44, so that, given the temperature T of the battery 22, the inner resistance Rb corresponding to the given temperature T can be introduced from the map. An example of a map showing correlation between the inner resistance Rb and temperature of the battery 22 is shown in FIG. 4.

With the inner resistance Rb obtained, the optimum current range IR is determined based on the inner resistance Rb and the battery electromotive voltage Vbo read at step S100 (step S106). Here, the optimum current range IR is a range of battery current Ib corresponding to outputs which can be extracted from the battery 22 by driving the DC/DC converter 24. Specifically, the optimum current range IR is a range the upper limit of which is defined by a current corresponding to the maximum output BPmax which can be extracted from the battery 22. The optimum current range IR will be described below.

An output BP which can be extracted from the battery 22 is expressed as the expression (3) using a battery voltage Vb and a battery current Ib.

$$BP = Vb \times Ib \qquad (3)$$

The battery voltage Vb is expressed as the expression (4) using the inner resistance Rb and electromotive voltage Vbo of the battery 22.

$$Vb = Vbo - Ib \times Rb \qquad (4)$$

Substitution of the expression (4) into the expression (3) results in the expression (5).

$$BP = (Vbo - Ib \times Rb) \times Ib \qquad (5)$$
$$= -Rb(Ib - Vbo/2Rb)^2 + Vbo^2/4Rb$$

Figure 5:
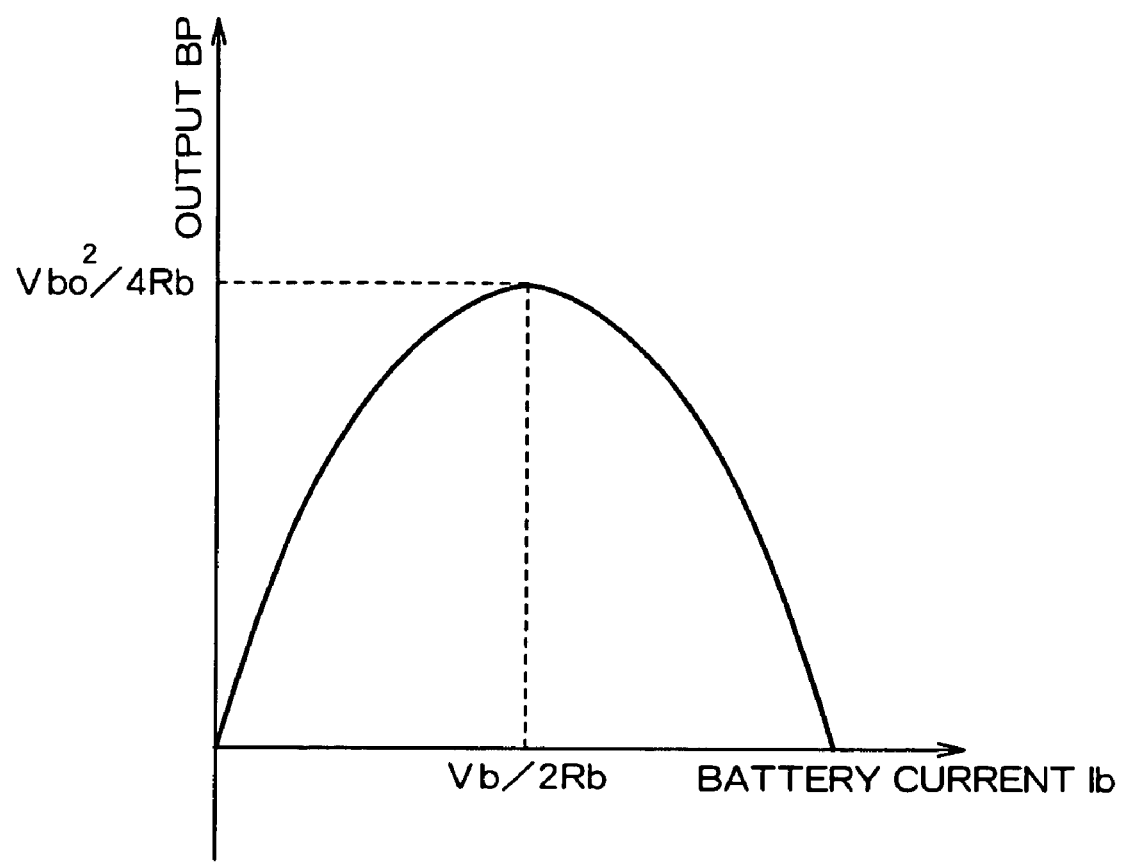
FIG. 5 is a diagram showing one example of output characteristic of the battery 22.

The expression (5) exhibits output characteristics of the battery 22, as shown in FIG. 5, concerning correlation between a battery output BP and a battery current Ib. As shown in FIG. 5, in order to extract the maximum output $Vbo^2/4Rb$ from the battery 22, the DC/DC converter 24 may be given driving control such that the battery current Ib becomes equal to a value Vb/2Rb. As such, should driving control of the DC/DC converter 24 be conducted such that the battery current Ib exceeds a value Vb/2Rb, power consumption by the inner resistance Rb of the battery 22 will increase, resulting in drop of output BP extracted from the battery 22.

Figure 6:
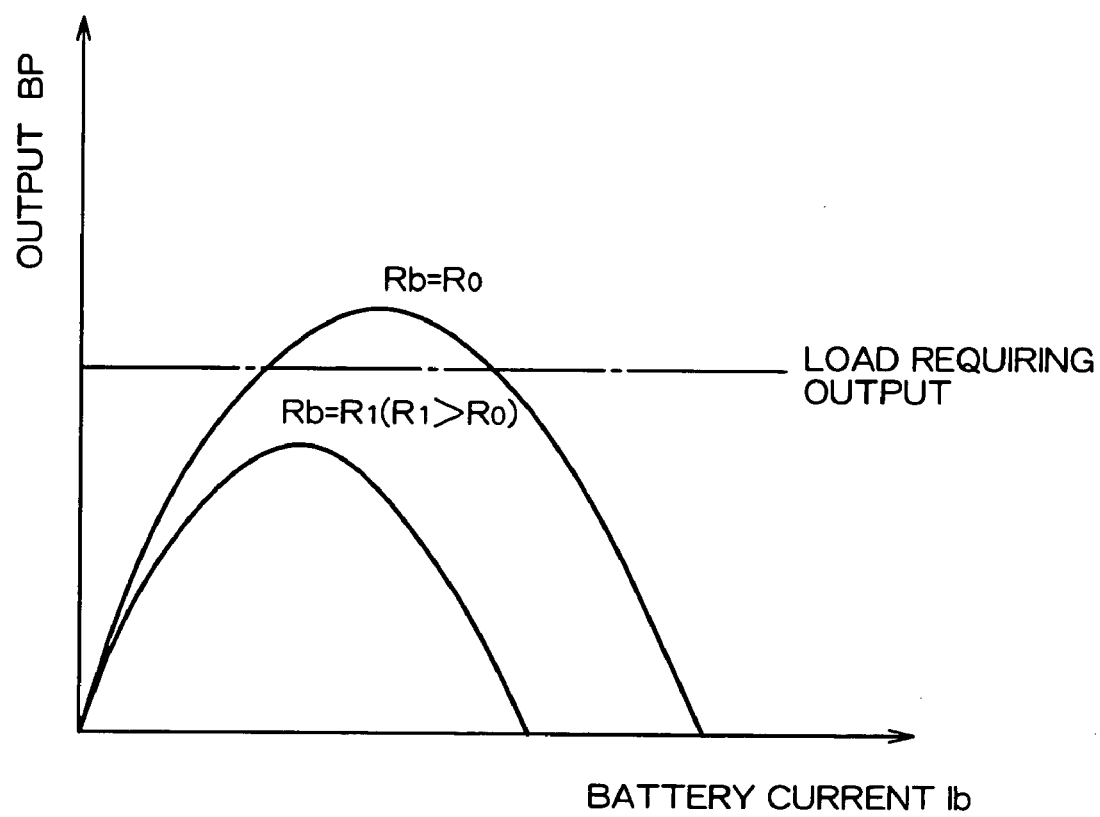
FIG. 6 is a diagram showing output characteristics of the battery 22 with the inner resistance Rb of the battery 22 being a value R0 and those of the battery 22 with the inner resistance Rb being a value 1 (R1>R0)

FIG. 6 shows output characteristics of the battery 22 with its inner resistance Rb equal to a value R0 and those with its inner resistance Rb equal to a value R1 (R1>R0). As shown in FIG. 6, with the inner resistance Rb equal to a value R0, the amount of output corresponding to a required output P of the load can be provided using an output BP extracted from the battery 22. With the inner resistance Rb equal to a value R1, on the other hand, it cannot be fully provided using an output BP from the battery 22. When such an amount of power cannot be fully provided using an output BP from the battery 22, and should the DC/DC converter 24 then be given driving control so as to increase the battery current Ib over a value Vb/2Rb (that is, to increase a boosting rate), only a reduced amount of output BP can be extracted from the battery 22. With a drop of output BP extracted from the battery 22, the shortage is compensated for using the power stored in the capacitor 26 and, therefore, the voltage of the capacitor 26 is remarkably reduced.

Therefore, in such a case, when driving control of the DC/DC converter 24 is conducted such that the battery current Ib remains in a current range having an upper limit of a value Vb/2Rb, the maximum output BPmax from the battery 22 can be reliably obtained while a voltage drop with the capacitor 26 can be minimized even when the amount of power corresponding to the required output P of the load 28 cannot be fully provided using an output BP of the battery 22.

Here, it should be noted that the optimum current range IR is not necessarily a range having an upper limit defined by a current value Vb/2Rb corresponding to the maximum output BPmax of the battery 22. Alternatively, the optimum current range IR may have an upper limit defined by a value slightly smaller than a current value Vb/2Rb or even by a value little larger than a value Vb/2Rb as long as it is within a tolerable range.

After setting the optimum current range IR as described above, whether or not the battery current Ib remains in the optimum current range IR is determined (step S108). When it is determined that the battery current Ib remains in the optimum current range IR, it is concluded that the duty ratio D calculated at step S102 requires no limitation. Thus, the DC/DC converter 24 is given driving control using the duty ratio D (step S110) and a limitation flag F is turned off (step S112) before the present routine is completed.

Meanwhile, when it is determined that the battery current Ib does not remain in the optimum current range IR, the duty ratio D calculated at step S102 is limited such that the battery current Ib remains in the optimum current range IR. Thereafter, the DC/DC converter 24 is given driving control using the thus limited duty ratio D (step S114) and the limitation flag F is turned on (step S116) before the present routine is completed. It should be noted that the limitation flag F indicates whether or not a current duty ratio D is limited and is used in driving control of the load 28 to be described later.

In the following, driving control of the load 28 will be described.

Figure 7:
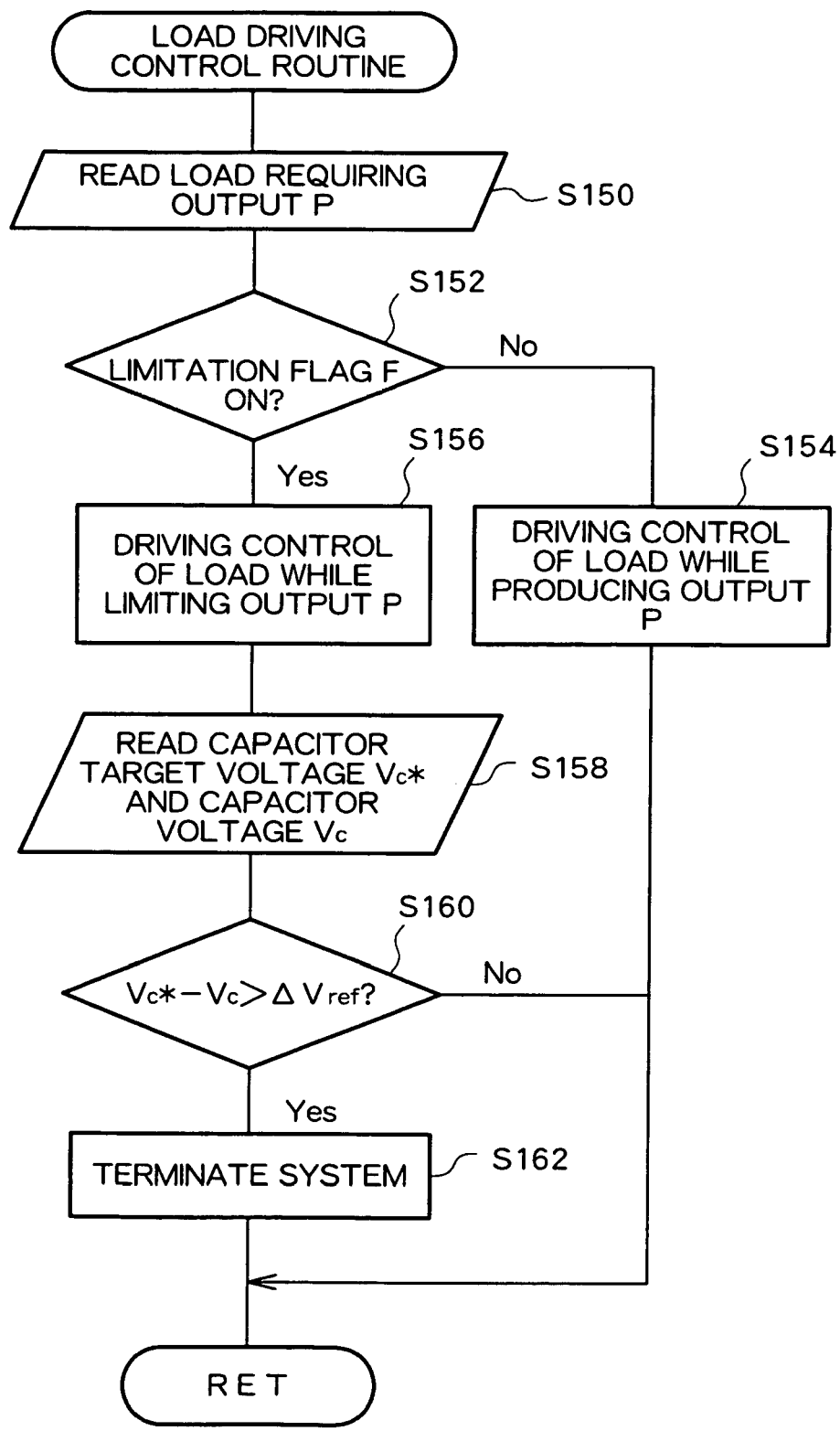
FIG. 7 is a diagram showing an exemplary load driving control routine to be executed by the electronic control unit 40 of the driving system 20.

FIG. 7 is a flowchart of an example of a load driving control routine to be executed by an electronic control unit 40 of the driving system 20 in this embodiment. This routine is repetitively performed at predetermined intervals of time (e.g., every 0.2 msec).

Upon start of the load driving control routine, the CPU 42 of the electronic control unit 40 reads a load requiring output P which is to be used as a command value concerning driving of the load 28 (step S150). Then, whether or not the limitation flag F, as manipulated at steps S112 and S116, remains in an ON state is determined (step S152). When it is determined that the limitation flag F remains in an OFF state, in other words, when the duty ratio D of the DC/DC converter 24 is not limited at the step S110 of the routine of FIG. 3, the load 28 is given driving control so as to be driven using an output corresponding to the load requiring output P (step S154) before the present routine is completed.

Meanwhile, when it is determined that the limitation flag F remains in an ON state, in other words, when the duty ratio D of the DC/DC converter 24 is limited at step S114 of the routine of FIG. 3, the load 28 is given driving control while limiting the load requiring output (or using a limited output LP). This limitation is employed to reduce an output of the load 28 while considering that an output BP corresponding to a load requiring output P cannot be fully extracted from the battery 22 when the duty ratio D of the DC/DC converter 24 is limited. This arrangement makes it possible to bring the voltage Vc of the capacitor 26 into a stable condition (condition near a target voltage Vc*) by bringing the output from the battery 22 and that from the load 28 closer to each other.

It should be noted that limitation of a load requiring output P (a limited output LP) can be applied, for example, through subtraction of a deviation energy from a load requiring output P, the deviation energy being a deviation between the amount of energy of the capacitor 26 corresponding to the capacitor voltage Vc which is determined by the voltage sensor 34 in the current routine and that in the last routine. That is, the limitation of a load requiring output P can be achieved using the expression (6), in which C represents a capacitance of the capacitor 26.

$$LP=P-C\times(\text{present }Vc^2-\text{last }Vc^2)/2 \tag{6}$$

Alternatively, the limitation of a load requiring output P can be achieved using, as a load requiring output P, a limited output LB which is obtained through subtraction beforehand by a predetermined value, or using, as a limited output LP, a load requiring output P which is read in the last routine.

After driving the load 28 at step S156, a capacitor target voltage Vc* and a capacitor voltage Vc, which is detected using the voltage sensor 34, are read (step S158), and whether or not a deviation between the capacitor target voltage Vc* and capacitor voltage Vc exceeds a threshold ΔVref is determined (step S160). When it is determined that the deviation exceeds the threshold ΔVref, the driving system 20 is terminated (step S162) before the present routine is completed.

Specifically, a deviation in excess of the threshold Δvref indicates that the voltage Vc is significantly deviate from the target voltage Vc* of the capacitor 26 even though an output of the load 28 is limited, which is considered as an abnormal operation of the driving system 20 and the operation of the driving system 20 is thus terminated. The driving system 20 can be terminated by halting switching operation of the transistors T1, T2 of the DC/DC converter 24 or driving of the load 28.

Meanwhile, when it is determined that the deviation between the capacitor target voltage Vc* and the capacitor voltage Vc is less than or equal to the threshold value ΔVref, it is considered that the driving system 20 is in a normal operation and the present routine is completed.

In the driving system 20 according to this embodiment as described above, a duty ratio D is adjusted such that a battery current Ib remains in the optimum current range IR having an upper limit defined by a current value corresponding to the maximum output BPmax of the battery 22 and driving control of the DC/DC converter 24 is applied using the thus adjusted duty ratio D. This arrangement ensures the optimum power PBmax which can be output from the battery 22, so that a voltage drop of the capacitor 26 can be suppressed, while driving the load 28 in a stable condition, even when a power corresponding to an output P required by the load 28 cannot be extracted from the battery 22.

Moreover, because the output of the load 28 is limited when the duty ratio D is limited, the voltage Vc of the capacitor 26 can be maintained at a more stable condition using the target voltage Vc*. This allows use of any capacitor 26 having a smaller capacity. Further, as operation of the system is terminated should, despite limitation imposed on an output of the load 28, the voltage Vc of the capacitor 26 not be in a stable condition, system safety can be ensured.

In the following, a driving system 120 according to a second embodiment of the present invention will be described.

Figure 8:
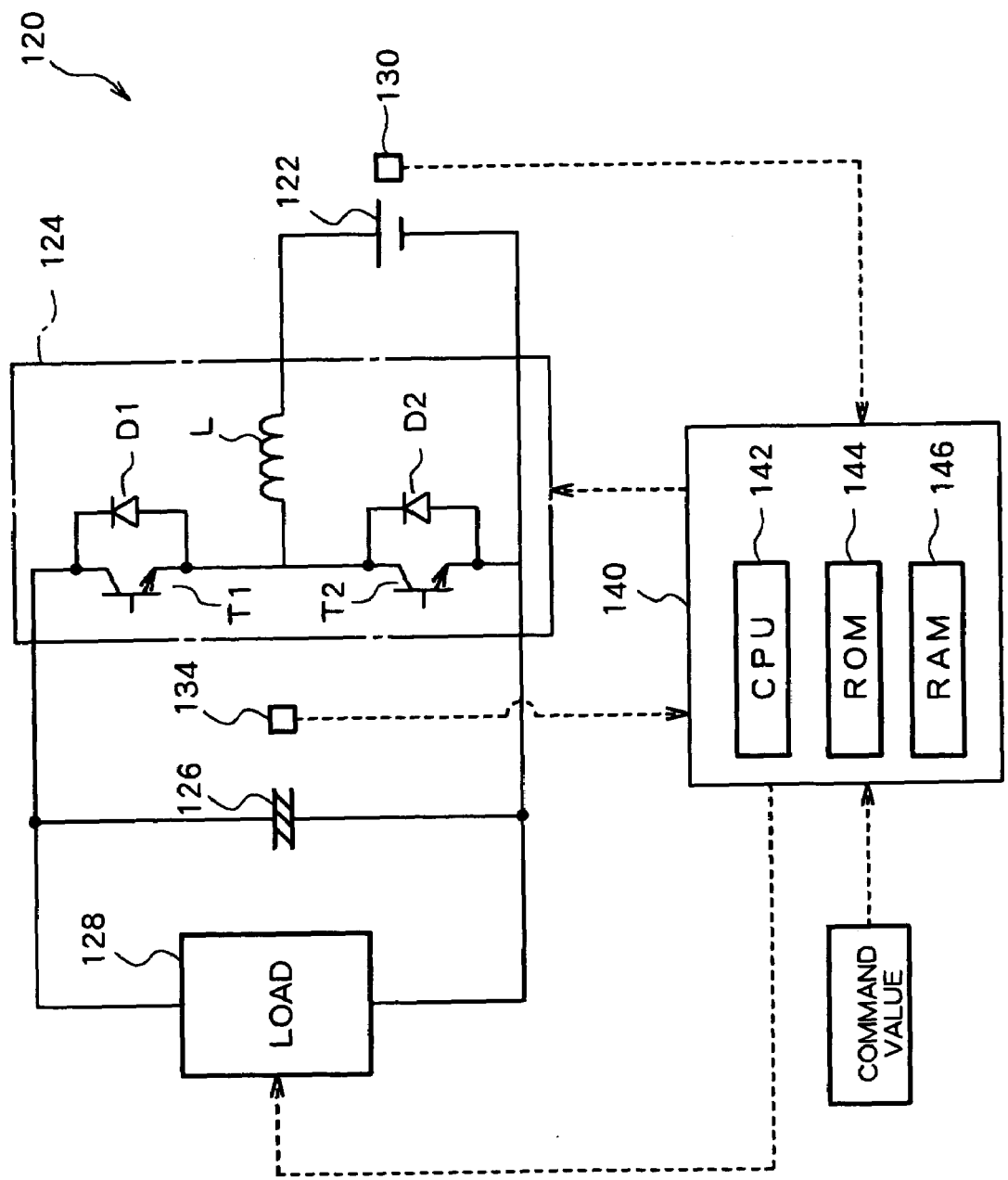
FIG. 8 is a diagram schematically showing a structure of a driving system 120 of a second embodiment of the present invention.

FIG. 8 is a schematic diagram showing a structure of a driving system 120 according to a second embodiment of the present invention. The hardware structure of the driving system 120 according to the second embodiment is identical to that of the driving system 20 in the first embodiment, with the notable exception that the driving system 120 does not have a current sensor 32, which is included in the driving system 20. Therefore, structural elements of the driving system 120 in the second embodiment, identical to those of the driving system 20 in the first embodiment are identified using similar reference numbers added by 100, and not explained again.

Figure 9:
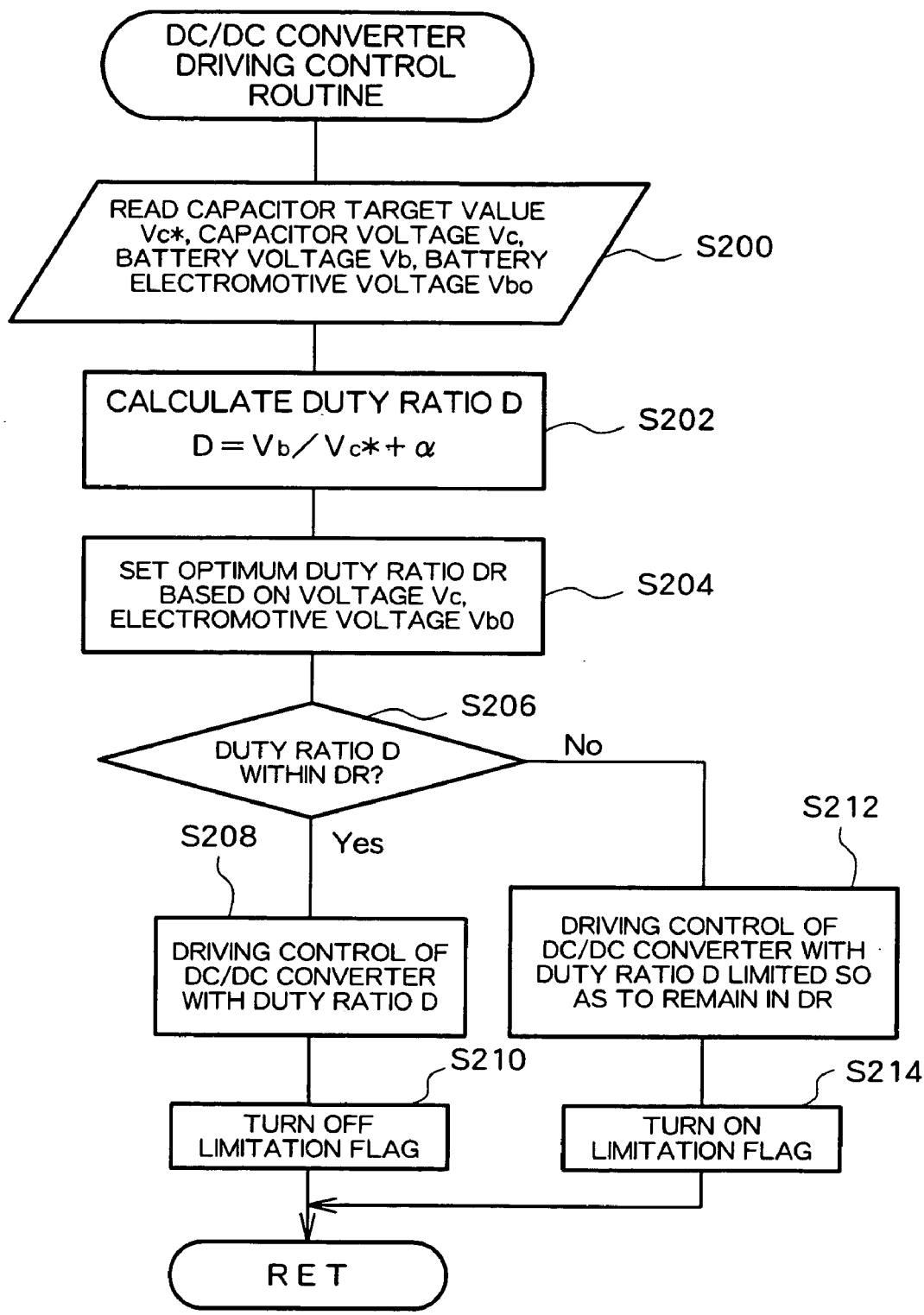
FIG. 9 is a diagram showing an exemplary DC/DC converter driving control routine to be executed by an electronic control unit 140 of the driving system 120 in the second embodiment.

FIG. 9 is a flowchart of an example of a DC/DC converter driving control routine to be executed by the electronic control unit 140 of the driving system 120 in the second embodiment. That is, the driving system 120 in the second embodiment performs the routine of FIG. 9, rather than that of FIG. 3. This routine of FIG. 9 is repetitively performed at predetermined intervals of time (for example, 0.2 msec).

Specifically, upon start of the DC/DC converter driving control routine, the CPU 142 of the electronic control unit 140 reads a capacitor target voltage Vc*, a capacitor voltage Vc, a battery voltage Vb, and a battery electromotive voltage Vbo (step S200). Then, the CPU 142 calculates a duty ratio D based on the read capacitor target votlate Vc* and battery voltage Vb and using the expression (1) described above (step S202), and then determines the optimum duty range DR based on the read out capacitor voltage Vc and battery electromotive voltage Vbo (step S204). Here, the optimum duty range DR is a range of duty ratios D corresponding to outputs which can be extracted from the battery 22 by driving the DC/DC converter. Specifically, the lower limit of the optimum duty range DR is defined by a duty ratio D corresponding to the maximum output BPmax which can be extracted from the battery 122.

In the following, the optimum duty range DR will be described in detail.

An output BP when the driving system 120 is viewed from the load 128 is expressed using the expression (7) below, based on the duty ratio D, the capacitor voltage Vc, and the battery current Ib.

$$BP=Vc\times Ib\times D \tag{7}$$

The battery current Ib is expressed using the expression (8) below.

$$Ib=(Vbo-D\times Vc)/Rb \tag{8}$$

Substitution of the expression (8) into the expression (7) results in the expression (9).

$$BP=-Vc^2/Rb(D-Vbo/2Vc)^2+Vbo^2/4Rb \tag{9}$$

Figure 10:
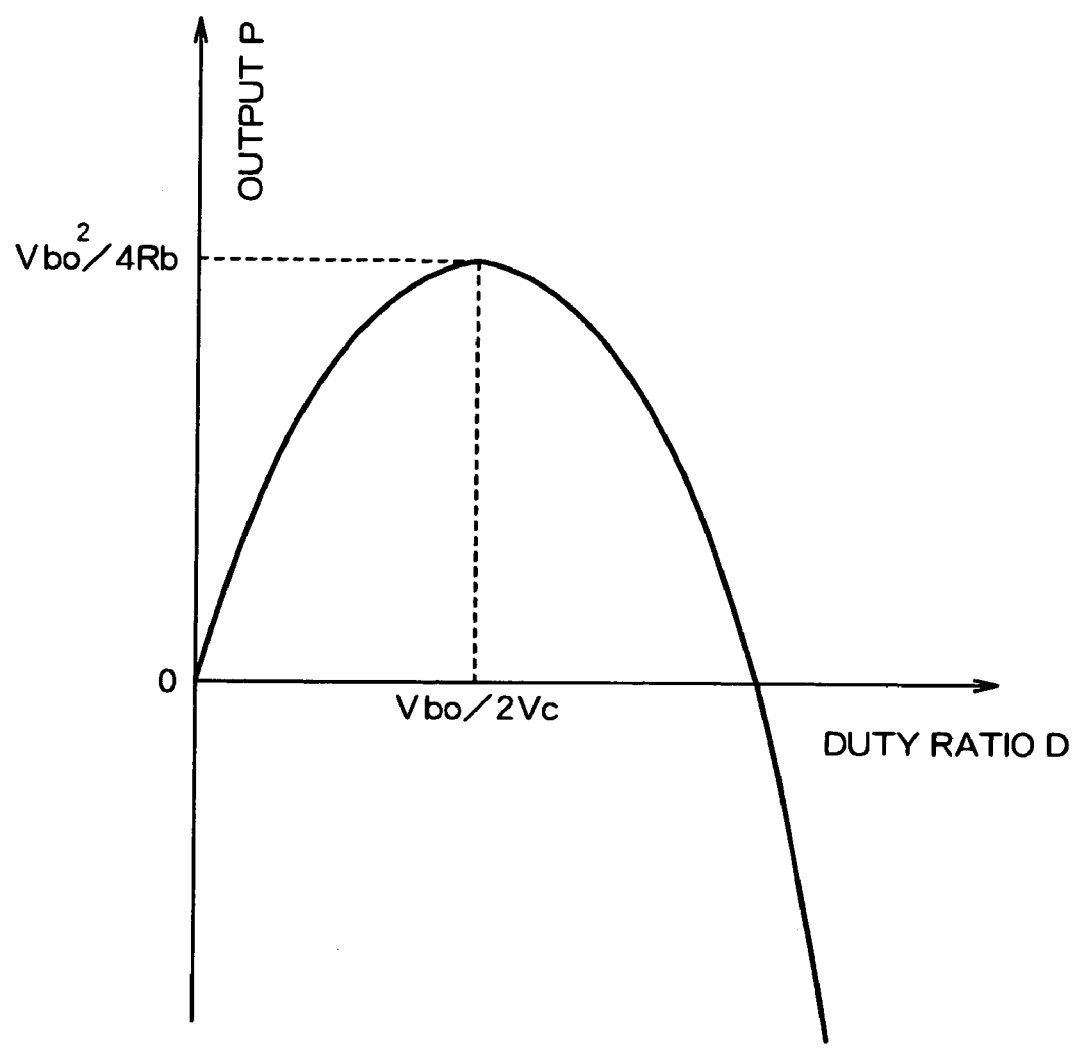
FIG. 10 is a diagram showing an example of output characteristics of the battery 122.
Figure 11:
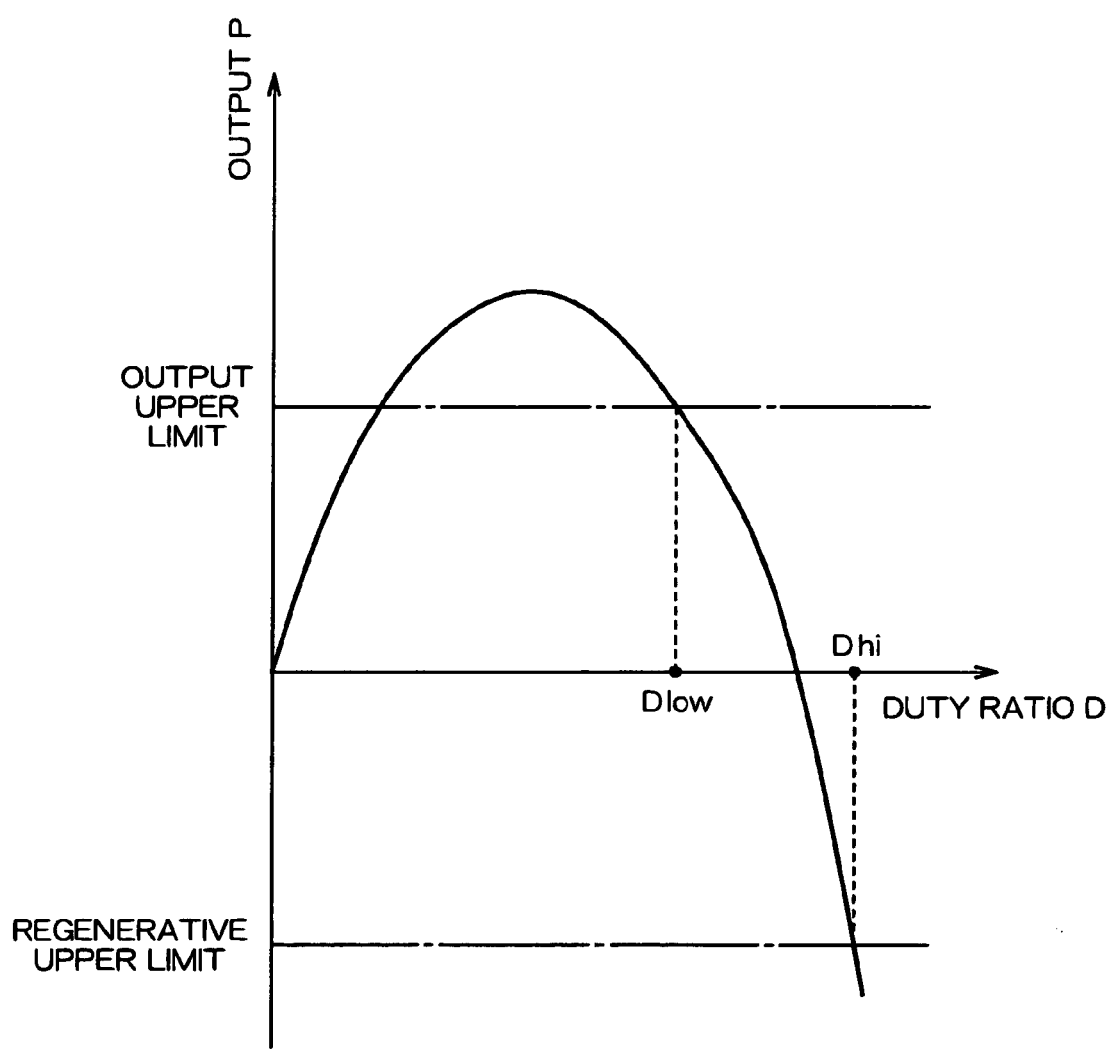
FIG. 11 is a diagram showing setting of an optimum duty ratio DR.

The expression (9) exhibits output characteristics of the battery 122, as shown in FIG. 10, concerning correlation between an output BP and a duty ratio D. As shown in FIG. 10, in order to extract the maximum output Vbo²/4Rb from the battery 122, the DC/DC converter 124 is to be given driving control such that the duty ratio D becomes equal to a value Vbo/2Vc. As such, should driving control of the DC/DC converter 124 be conducted such that the duty ratio D becomes smaller than a value Vb/2Vc (that is, to increase a boosting rate), an output BP extracted from the battery 122 will decrease.

Therefore, when driving control of the DC/DC converter 124 is conducted such that the duty ratio D remains in a range having a lower limit of a value Vbo/2Vc, the maximum output Bpmax from the battery 122 can be ensured while the load 128 can be driven in a stable condition.

Here, it should be noted that the optimum duty range DR is not necessarily the range having a lower limit defined by a current value Vbo/2Vc corresponding to the maximum output BPmax of the battery 122. Alternatively, an output value slightly smaller than the maximum output of the battery 122 may be set as an output upper limit while a regenerative upper limit is also set, so that a range defined by the lower duty ratio Dlow corresponding to the output upper limit and by the upper duty ratio Dhi corresponding to the regenerative upper limit may be used as the optimum duty range DR. Still alternatively, a value slightly larger or smaller than a duty ratio Vbo/2Vc may be used as the upper limit, as long as it is within a tolerable range.

After setting the optimum duty range DR as described above, whether or not the duty ratio D calculated at step S202 remains in the optimum duty range DR is determined (step S206). When it is determined that the duty ratio D remains in the optimum duty range DR, the DC/DC converter 124 is given driving control using the duty ratio D (step S208) and a limitation flag F is turned off (step S210) before the present routine is completed.

Meanwhile, when it is determined that the duty ratio D calculated at step S202 does not remain in the optimum duty range DR, the duty ratio D is limited so as to remain within the optimum duty range DR and the DC/DC converter 124 is given driving control using the thus limited duty ratio D (step S212). Further, the limitation flag F is turned on (step S214) before the present routine is completed.

As described above, as driving control of the DC/DC converter 124 is conducted such that the duty ratio D remains in the optimum duty range DR, the driving system 120 in the second embodiment can ensure the maximum output BPmax from the battery 122 and thus produce the same advantage as that of the driving system 20 in the first embodiment. In particular, because inner resistance of the driving system 122, which cannot easily be calculated with accuracy, is not used as a control parameter for the DC/DC converter 124, controllability of the DC/DC converter 124 can be enhanced. However, through the load driving routine of FIG. 7, the same advantage as that of the driving system 20 in the first embodiment can be obtained also with respect to driving of the load 128.

In the following, a driving system according to a third embodiment of the present invention will be described. The hardware structure of the driving system according to the third embodiment is identical to that of the driving system 120 in the second embodiment. Therefore, structural elements of the modified driving system identical to those of the driving system 120 in the second embodiment are not explained again.

Figure 12:
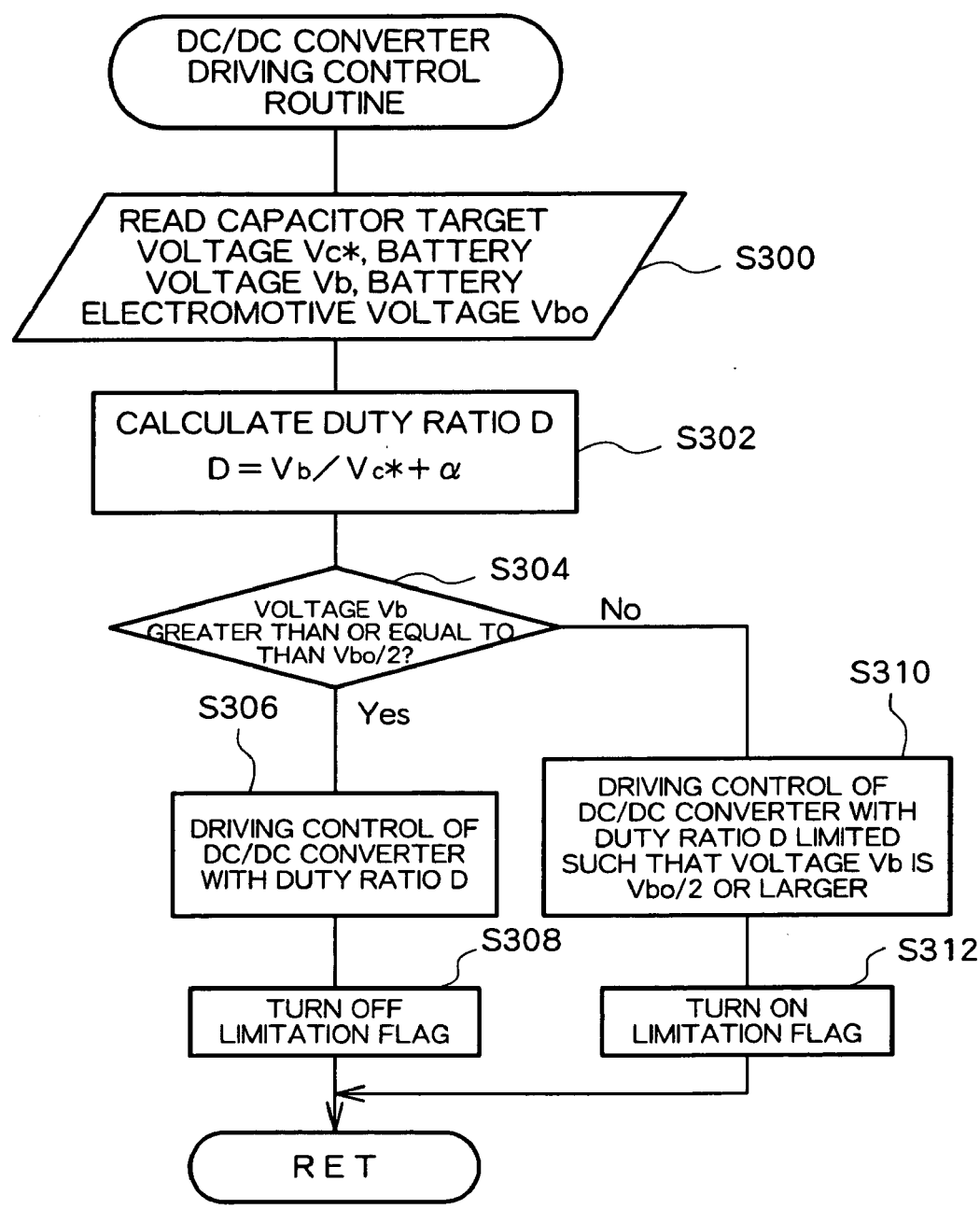
FIG. 12 is a flowchart of an exemplary DC/DC converter driving control routine to be executed by an electric control unit of a driving system in a modified example.

The third driving system performs a DC/DC converter driving control routine as shown in FIG. 12, rather than that of FIG. 3 or FIG. 9. Specifically, upon start of the routine, the CPU of the electronic control unit reads a capacitor target voltage Vc*, a battery voltage Vb, and a battery electromotive voltage Vbo (step S300). Then, the CPU calculates a duty ratio D based on the read capacitor target votlate Vc* and battery voltage Vc and using the above-described expression (1) (step S302) and determines whether the battery voltage Vb read at step S300 is greater than or equal to a value Vbo/2 (step S304). When it is determined that the battery voltage Vb is greater to or equal to a value Vbo/2, the DC/DC converter is given driving control using the duty ratio D calculated at step S302 (step S306) and the limitation flag F is turned off (step S308) before the present routine is completed.

Meanwhile, when it is determined that the battery voltage Bv is smaller than a value Vbo/2, the duty ratio D is limited such that the battery voltage Vb becomes greater than or equal to a value Vbo/2 (that is, to increase a boosting rate). Then, the DC/DC converter 124 is driven using the thus limited duty ratio D (step S310) and the limitation flag F is turned on (step S314) before the present routine is completed.

Here, the significance of the determination made at S304 as to whether or not the battery voltage Vb is greater than or equal to a value Vbo/2 will be described.

A battery voltage Vb can be calculated based on a battery electromotive voltage Vbo, a battery current Ib, and inner resistance Rb and using the expression (10) below.

$$Vb = Vbo - Ib \times Rb \tag{10}$$

Meanwhile, as a battery current Ib when the maximum output Bpmax is extracted from a battery is equal to a value Vbo/2Rb, as described above with reference to the driving system 20 in the first embodiment, a battery voltage Vb at this time can be expressed using the expression (11) below.

$$Vb = Vbo/2 \tag{11}$$

From the fact that driving control of the DC/DC converter 24 is conducted such that a battery current Ib becomes less than or equal to a value Vbo/2Rb in the driving system 10 of the first embodiment, it can be understood that driving control of the DC/DC converter must be conducted such that the battery voltage Vb becomes equal to Vbo/2 or larger, in other words, a voltage drop due to the inner resistance of the battery becomes equal to a value Vbo/2 or smaller in the driving system of the third embodiment. This is the significance of the determination as to whether or not the battery voltage Vb is greater than or equal to a value Vbo/2. Therefore, the driving system in the third embodiment also can produce the same advantage as that which can be produced by the driving systems 20, 120 in the first and second embodiments. Through the load driving routine of FIG. 7, the same advantage as that which can be obtained by the driving system 20 in the first embodiment can be obtained also with respect to driving of the load 128.

It should be noted that, although driving control of the DC/DC converter is conducted using a limited duty ratio D when the battery voltage Vb is smaller than a value Vbo/2, a limited duty ratio D may be used in driving control of the DC/DC converter when the battery voltage Vb is smaller than a value slightly larger than a value Vbo/2. Alternatively, a limited duty ratio D may be used in driving control of the DC/DC converter also when the battery voltage Vb is smaller than a value slightly smaller than a value Vbo/2 as long as it is within a tolerable range.

In the following, a fourth embodiment of the present invention will be described. The hardware structure of the fourth embodiment is identical to that of the first embodiment of FIG. 1.

In the fourth embodiment, a battery voltage Vb, a battery current Ib, and a battery electromotive voltage Vbo of the battery 22 are determined, similar to the above embodiments, and an inner resistance Rb of the battery 22 is always detected using the above-described expression (2). Further, the maximum permissible current Ibmax is determined based on at least one of the capacity of a current which can be supplied to the transistors T1, T2, which serve as switching elements of the DC/DC converter 24, or that which can be supplied to the battery 22, and stored in the ROM 44 or the like in the electronic control unit 40, for example. That is, the maximum permissible current Ibmax is determined by selecting either one, or a larger one, of the capacities of a current which can be supplied to the transistors T1, T2 or which can be supplied to the battery 22. It should be noted that any non-volatile memory may be employed for the ROM 44, with a rewritable EEPROM or a flash memory being preferable.

The upper and lower limits of a duty ratio D in switching of the transistors T1, T2 are determined based on the maximum permissible current Ibmax, an inner resistance Rb of the battery 22, an electromotive voltage Vbo of the battery 22, and a voltage Vdc of the capacitor 26, and the switching in the DC/DC converter 24 is limited such that the duty ratio D remains in that range.

That is, as indicated by the above expression (8), the current Ib of the battery 22 is expressed as Ib=(Vbo−D×Vc)/Rb, the duty ratio D is expressed as D=(Vbo−Rb×Ib)/Vc. Then, the duty ratio D is controlled so as to remain in a range (Vbo−Rb×Ibmax)/Vc≦D≦(Vbo−Rb×(−Ibmax)/Vc, wherein the positive sign attached to Ibmax corresponds to a direction of discharging from the battery 22, while the negative sign corresponds to the direction of charging.

Figure 13:
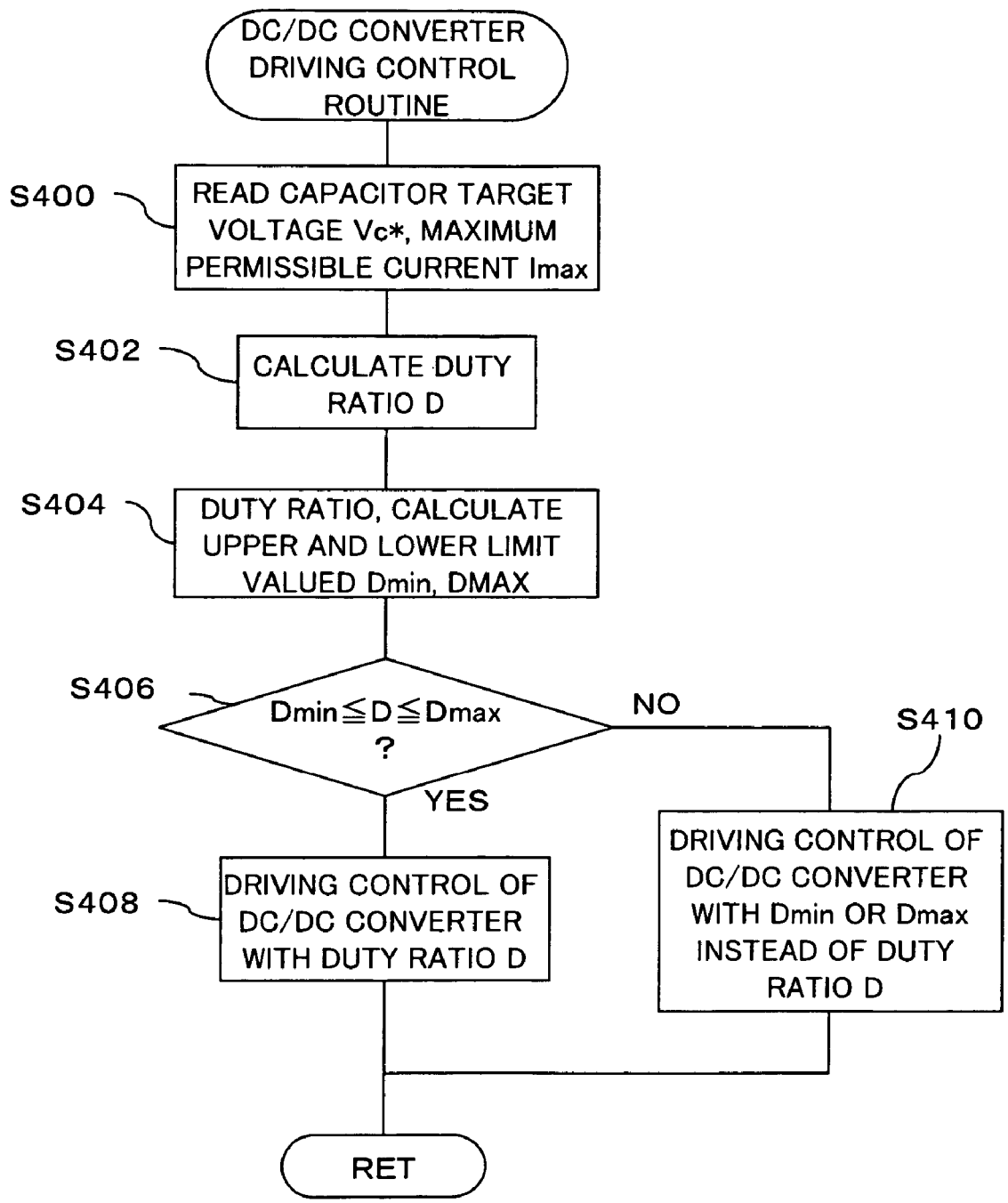
FIG. 13 is a flowchart of an exemplary DC/DC converter driving control routine to be executed by an electronic control unit 40 of the driving system in the embodiment.

Operation according the fourth embodiment will be described referring to FIG. 13.

Initially, a command concerning a target voltage Vc* of the capacitor 26 and the maximum permissible current Imax are received (S400). It should be noted that a battery voltage Vb, a battery curreht Ib, a battery electromotive voltage Vbo, and inner resistance Rb are also received.

Based on the received target voltage Vc*, a duty ratio command D is calculated (S402). This calculation is performed as D=(Vbo−Vb)/Ib, similar to the above.

Subsequently, the lower limit Dmin=(Vbo−Rb×Ibmax)Vc and Dmax=(Vbo−Rb×(−Ibmax))/Vc of the duty ratio D are calculated (S404).

Then, whether or not the duty ratio D calculated at S402 remains in a range defined by the lower limit Dmin and the upper limit Dmax is determined (S406). When it is determined as YES at S406, the DC/DC converter 24 is driven using the calculated duty ratio D (S408). Meanwhile, when it is determined as NO at S406, the DC/DC converter 24 is driven using the duty ratio Dmin in the case where the duty ratio D is smaller than the value Dmin or the duty ratio Dmax in the case where the duty ratio D is larger than the value Dmax, so that the duty ratio D remains in a range Dmin≦D≦Dmax (S410).

As described above, by controlling the duty ratio of the transistors T1, T2 so as to remain in a predetermined range, it is possible to limit the current Ib so as not to exceed the maximum permissible current of the transistors T1, T2, which serve as switching elements of the DC/DC converter 24, or the maximum permissible current of the battery 22.

In the following, a fifth embodiment of the present invention will be described. Although whether or not the duty ratio D remains in a predetermined range is determined and the duty ratio is controlled such that the battery current Ib remains in a predetermined range in the fourth embodiment, in the fifth embodiment whether or not the battery current Ib remains in a predetermined range is determined and, when it does not, the duty ratio is adjusted such that the battery current Ib remains in the predetermined range.

Initially, a command concerning a target voltage Vc* of the capacitor 26 and the maximum permissible current Imax are received (S500). In addition, a battery voltage Vb, a battery current Ib, a battery electromotive voltage Vbo, and inner resistance Rb are also received. Based on the received target voltage Vc*, a duty ratio command D is calculated (S502). This calculation is performed as D=(Vbo−Vb)/Ib, similar as in the above. The processing at S500 and S502 is identical to that at S400, S402.

Subsequently, a battery current Ib is received (S504) and whether or not the received battery current Ib is greater than or equal to 0 is determined (S506).

Determination of YES at S506 indicates that the current Ib is in a discharging direction. Then, whether or not the current Ib exceeds the maximum permissible current Ibmax is determined (S508). In such a case, when the determination at S508 is YES, the current Ib remains out of a predetermined range and variable X=α is set (S510). Meanwhile, a determination of NO at S508 indicates that the current Ib remains in a predetermined range and variable X=0 is set (S512).

Determination NO at S506 indicates the current Ib in a discharging direction and, then, whether or not the current Ib is smaller than the maximum permissible current—imbax is determined (S514). Determination YES at S514 indicates that the current Ib remains out of a predetermined range and a variable X=−α is set (S516). Meanwhile, determination NO at S514 indicates that the current Ib remains in a predetermined range and the variable X=0 is set (S518).

Then, the variable X is added to the duty ratio D calculated at S502 to thereby limit the duty ratio and driving control of the DC/DC converter 24 is conducted based on the limited duty ratio D (S520). That is, when the current Ib is in a discharging direction and in excess of Ibmax, α is added to the calculated duty ratio D to thereby expand a period with the upper transistor T1 remaining in an ON state and reduce the current Ib. When the current Ib is in a charging direction and smaller than Ibmax, on the other hand, −α a is added to the calculated duty ratio D to thereby expand a period with the lower transistor T2 remaining in an ON state and reduce the charge current Ib.

In the fifth embodiment, by controlling the duty ratio of the transistors T1, T2, similar to the fourth embodiment, it is possible to limit the current Ib so as not to exceed the maximum permissible current of the transistors T1, T2, which serve as switching elements of the DC/DC converter 24, or the maximum permissible current of the battery 22.

It should be noted that the driving systems of the fourth and fifth embodiments can be used in combination with any combination of those of the first, second, and third embodiments as described above.

It should also be noted that, although the electric control units 40, 140 conduct driving control of both the DC/DC converters 24, 124 and the loads 28, 128 in the driving systems 20, 120 of the first through fifth embodiments, driving control of the DC/DC converters 24, 124 and the loads 28, 128 may be conducted using separate electronic control units which exchange information through communication.

It should also be noted that, although capacitors 26, 126 are provided between the DC/DC converters 24, 124 and the loads 28, 128 in the driving systems 20, 120 in the first through fifth embodiments, may also be configured such that the capacitors 26, 126 are not be provided.

According to one aspect, there is preferably provided a program for having a computer to operate as a control system for applying driving control to a DC/DC converter and/or a load. According to another aspect, there is preferably provided a computer readable recording medium which stores the program. This medium may include any of a variety of recording media, such as a CD-ROM, DVD-ROM, a flexible disk, or the like. By installing such a program into a computer and executing the computer, an advantage of the present invention can be similarly produced.

In the above, embodiments of the present invention are described while referring to examples. However, the present invention is not limited to these examples and can be implemented in a variety of manners without departing from the scope of the present invention.

The invention claimed is:

1. A voltage conversion device having a reactor for temporarily storing energy based on a current from a power source, for converting a voltage of the power source, which is input while utilizing the reactor, into a desired voltage through switching of a switching element to output, comprising:
   a condition detection circuit for detecting an electromotive voltage and inner resistance of the power source as a condition of the power source; and
   a control circuit for setting a current range of the power source based on output characteristic of the power source corresponding to the detected condition of the power source and for applying switching control to the switch element such that the current of the power source remains within the current range set by a current range setting circuit,
   wherein
   the power source is chargeable and dischargeable, and, an output obtained through conversion into the desired voltage is supplied to a load.

2. The voltage conversion device according to claim 1, wherein the current range is a range an upper limit of which is a current corresponding to a maximum output in the output characteristics of the power source.

3. The voltage conversion device according to claim 1, wherein the output characteristic of the power source is a characteristic expressed in the form of a secondary function including a variable which is a current of the power source.

4. A driving system for driving a load using a power output from a voltage conversion device for converting a voltage of a power source into a desired output voltage,
   wherein
   the voltage conversion device according to claim 1 is used as the voltage conversion device,
   the driving system comprises a load driving control circuit for controlling an output of the load while receiving a voltage output from the voltage conversion device,
   the power source is chargeable and dischargeable, and, the desired output voltage is supplied to a load.

5. The driving system according to claim 4, further comprising:
   a storage circuit positioned between the voltage conversion device and the load, for temporarily storing an output from the voltage conversion device,
   wherein
   the load driving control circuit has a circuit for limiting an output of the load according to a stored voltage of the storage circuit.

6. The driving system according to claim 5, wherein the load driving control circuit terminates driving of the load when a deviation between the stored voltage and a target voltage of the storage circuit is equal to or exceeds a predetermined value despite control by the load driving control circuit.

7. The driving system according to claim 4, wherein the load has a motor for rotation driving while receiving a power and a power adjustment circuit for adjusting the power output from the voltage conversion device into a power suitable for driving of the motor and supplying to the motor.

8. A vehicle carrying the driving system according to claim 7, wherein the motor is a motor for a vehicle.

9. A voltage conversion device having a structure in which an upper switching element and a lower switching element are serially connected and a reactor for temporarily storing energy based on a current from a power source is connected to a connection point of the both switching elements, for converting a voltage of the power source, which is input while utilizing the reactor, into a desired voltage through switching of the switching elements, the voltage conversion device, comprising:
   a condition detection circuit for detecting an electromotive voltage of the power source and a voltage on an output side of the voltage conversion device as a condition of the power source; and
   a control circuit for setting a ratio range based on output characteristics of the power source corresponding to the detected condition of the power source, the ratio range being a range of ratios each between a period with the upper switching element remaining in an ON state and a period with the lower switching element remaining in an ON state, and for controlling the ratio between the periods with the respective switching elements remaining in an ON state so as to remain within the set ratio range,
   wherein
   the power source is chargeable and dischargeable, and, an output obtained through conversion into the desired voltage is supplied to a load.

10. The voltage conversion device according to claim 9, wherein the ratio range is a range a lower limit of which is a ratio corresponding to a maximum output in the output characteristic of the power source.

11. The voltage conversion device according to claim 9, wherein the output characteristics of the power source is a characteristic expressed in the form of a secondary function including a variable which is a ratio between the periods with the respective switching elements remaining in an ON state.

12. A voltage conversion device having a reactor for temporarily storing energy based on a current from a power source, for converting a voltage of the power source, which is input while utilizing the reactor, into a desired voltage through switching of a switching element to output, comprising:
   a voltage detection circuit for detecting a voltage of the power source; and
   a control circuit for applying switching control to the switching element such that the detected voltage remains within a predetermined range which is determined based on the electromotive voltage of the power source,
   wherein
   the power source is chargeable and dischargeable, an output obtained through conversion into the desired voltage is supplied to a load, and
   the predetermined range is a range a lower limit of which is a half of the electromotive voltage of the power source.

13. A voltage conversion device for converting a voltage of a power source into a desired output voltage, comprising:
   a reactor having one end connected to one end of the power source;
   a switching circuit having a first switching element positioned between other end of the reactor and an output terminal and a second switching element positioned between the other end of the reactor and other end of the power source; and a control circuit for controlling switching of the first and second switching elements of the switching circuit,
wherein
the power source is chargeable and dischargeable,
the desired output voltage is supplied to a load, and
the control circuit limits a ratio between periods with the first and second switching elements remaining in an ON state such that the ratio remains in a predetermined range, based on permissible current capacities of the first and second switching element by controlling such that a proportion of a period with either one of the first and second switching elements remaining in an ON state, relative to combined periods with the first and second switching elements relatively remaining in an ON state remains equal to or smaller than (Vbo−Rb×Ibmax)/Vc, Vbo representing an output voltage of the power source, Rb representing inner resistance of the power source, Ibmax representing a permissible current capacity of the switching element, and Vc representing the output voltage.

14. A voltage conversion device for converting a voltage of a power source into a desired output voltage, comprising:
a reactor having one end connected to one end of the power source;
a switching circuit having a first switching element positioned between other end of the reactor and an output terminal and a second switching element positioned between the other end of the reactor and other end of the power source;
a control circuit for controlling switching of the first and second switching elements of the switching circuit; and
a current detector for detecting a current flowing through the first or second switching element,
wherein
the power source is chargeable and dischargeable,
the desired output voltage is supplied to a load, and
the control circuit limits a ratio between periods with the first and second switching elements remaining in an ON state based on the detected current value such that the ratio remains in a predetermined range by controlling such that a proportion of a period with either one of the first and second switching elements remaining in an ON state, relative to combined periods with the first and second switching elements relatively remaining in an ON state remains equal to or smaller than (Vbo−Rb×Ibmax)/Vc, Vbo representing an output voltage of the power source, Rb representing inner resistance of the power source, Ibmax representing a maximum value of a current of the power source, and Vc representing the output voltage.

15. A voltage conversion method for converting a voltage of a power source, which is input while utilizing a reactor for temporarily storing energy based on a current from the power source, into a desired voltage through switching of a switching element to output, comprising:
detection of an electromotive voltage and inner resistance of the power source as a condition of the power source;
setting a current range of the power source based on output characteristic of the power source corresponding to the detected condition of the power source; and
applying switching control to the switch element such that the current of the power source remains within the set current range,
wherein
the power source is chargeable and dischargeable, and,
an output obtained through conversion into the desired voltage is supplied to a load.

16. A method for converting a voltage of a power source utilizing a voltage conversion device having a structure in which an upper switching element and a lower switching element are serially connected and a reactor for temporarily storing energy based on a current from a power source is connected to a connection point of the both switching elements, into a desired voltage through switching of the switching elements, the voltage of the power source being input while utilizing the reactor, the method, comprising:
detecting an electromotive voltage of the power source and a voltage on an output side of the voltage conversion device as a condition of the power source;
setting a ratio range based on output characteristics of the power source corresponding to the detected condition of the power source, the ratio range being a range of ratios each between a period with the upper switching element remaining in an ON state and a period with the lower switching element remaining in an ON state; and
controlling the ratio between the periods with the respective switching elements remaining in an ON state so-as to remain within the set ratio range,
wherein
the power source is chargeable and dischargeable, and,
an output obtained through conversion into the desired voltage is supplied to a load.

17. A voltage conversion method for converting a voltage of a power source into a desired output voltage, comprising a reactor having one end connected to one end of the power source and a switching circuit having a first switching element positioned between other end of the reactor and an output terminal and a second switching element positioned between the other end of the reactor and other end of the power source,
wherein
a ratio between periods with the first and second switching elements remaining in an ON state is limited so as to remain in a predetermined range, based on permissible current capacities of the first and second switching elements by controlling such that a proportion of a period with either one of the first and second switching elements remaining in an ON state, relative to combined periods with the first and second switching elements relatively remaining in an ON state remains equal to or smaller than (Vbo−Rb×Ibmax)/Vc, Vbo representing an output voltage of the power source, Rb representing inner resistance of the power source, Ibmax representing a permissible current capacity of the switching element, and Vc representing the output voltage,
the power source is chargeable and dischargeable, and,
an output obtained through conversion into the desired voltage is supplied to a load.

18. A voltage conversion method for converting a voltage of a power source into a desired output voltage, comprising a reactor having one end connected to one end of the power source and a switching circuit having a first switching element positioned between other end of the reactor and an output terminal and a second switching element positioned between the other end of the reactor and other end of the power source,
wherein
a ratio between periods with the first and second switching elements remaining in an ON state is limited so as to remain in a predetermined range, based on a magnitude of a current flowing through the first or second switching element by controlling such that a proportion of a period with either one of the first and second switching element remaining in an ON state, relative to combined periods with the first and second switching element relatively remaining in an ON state remains equal to or smaller than (Vbo−Rb×Ibmax)/Vc, Vbo representing an output voltage of the power source, Rb representing inner resistance of the power source, Ibmax representing a maximum value of a current of the power source, and Vc representing the output voltage, the power source is chargeable and dischargeable, and, an output obtained through conversion into the desired voltage is supplied to a load.

19. A computer readable recording medium storing a control program for controlling a voltage conversion device having a reactor for temporarily storing energy based on a current from a power source which is chargeable and dischargeable, for converting a voltage of the power source, which is input while utilizing the reactor, into a desired voltage through switching of a switching element to output to a load, the program having a computer to execute:

detecting an electromotive voltage and inner resistance of the power source as a condition of the power source;

setting of a current range of the power source based on output characteristics of the power source corresponding to the detected condition of the power source; and switching control of the switching element such that the current of the power source remains within a current range set by a current range setting circuit.

20. A computer readable recording medium storing a control program for controlling a voltage conversion device having a structure in which an upper switching element and a lower switching element are serially connected and a reactor for storing, as energy, a current from a power source which is chargeable and dischargeable is connected to a connection point of both the switching elements, for converting a voltage of the power source, which is input while utilizing the reactor, into a desired voltage through switching of a switching element to output to a load, the program having a computer to execute:

detecting an electromotive voltage of the power source and a voltage on an output side of the voltage conversion device as a condition of the power source;

setting of a ratio range based on output characteristics of the power source corresponding to the detected condition of the power source, the ratio range being a range of ratios each between a period with the upper switching element remaining in an ON state and a period with the lower switching element remaining in an ON state, and control of the ratio between the periods with the respective switching elements remaining in an ON state so as to remain within the ratio range set by a ratio range setting circuit.

21. A computer readable recording medium storing a control program for controlling a voltage conversion device comprising a reactor having one end connected to one end of a power source which is chargeable and dischargeable and a switching circuit having a first switching element positioned between other end of the reactor and an output terminal and a second switching element positioned between the other end of the reactor and other end of the power source, for converting a voltage of the power source into a desired output voltage to supply to a load, the program having a computer to execute:

limitation of a ratio between periods with the first and second switching elements remaining in an ON state so as to remain in a predetermined range, based on permissible current capacities of the first and second switching elements by controlling such that a proportion of a period with either one of the first and second switching elements remaining in an ON state, relative to combined periods with the first and second switching elements relatively remaining in an ON state remains equal to or smaller than (Vbo−Rb×Ibmax)/Vc, Vbo representing an output voltage of the power source, Rb representing inner resistance of the power source. Ibmax representing a permissible current capacity of the switching element, and Vc representing the output voltage.

22. A computer readable recording medium storing control program for controlling a voltage conversion device comprising a reactor having one end connected to one end of a power source which is chargeable and dischargeable and a switching circuit having a first switching element positioned between other end of the reactor and an output terminal and a second switching element positioned between the other end of the reactor and other end of the power source, for converting a voltage of the power source into a desired output voltage to supply to a load, the program having a computer to execute:

limitation of a ratio between periods with the first and second switching elements remaining in an ON state so as to remain in a predetermined range, based on a magnitude of a current flowing through the first or second switching element by controlling such that a proportion of a period with either one of the first and second switching elements remaining in an ON state, relative to combined periods with the first and second switching elements relatively remaining in an ON state remains equal to or smaller than (Vbo−Rb×Ibmax)/Vc, Vbo representing an output voltage of the power source, Rb representing inner resistance of the power source, Ibmax representing a maximum value of a current of the power source, and Vc representing the output voltage.

* * * * *

UNITED STATES PATENT AND TRADEMARK OFFICE
CERTIFICATE OF CORRECTION

PATENT NO. : 7,199,537 B2
APPLICATION NO. : 10/500041
DATED : April 3, 2007
INVENTOR(S) : Mazaki Okamura It is certified that error appears in the above-identified patent and that said Letters Patent is hereby corrected as shown below:

In the Title Page: In the Title: Item (54) After "APPARATUS" delete ",".
  Item (75) "(75) Inventors:" change "Aichi-ken" to --Nishikamo-gun--.
  Item (30) "(30) Foreign Application Priority Data" change
    "Jan. 14, 2003" to --Jan. 16, 2002--.
In the Drawings: Fig. 2(a), change "MORTOR" to --MOTOR--.
  Fig. 3, change "DRIIVING" (first occurrence) to --DRIVING--.
  Fig. 13, box S404, change "VALUED" to --VALUE--.

| Column | Line | |
|---|---|---|
| 1 | 2 | After "APPARATUS" delete ",". |
| 1 | 33 | Change "bussbars" to --buss bars--. |
| 1 | 51 | After "converter" insert --to--. |
| 3 | 21 | Delete "of the present invention". |
| 7 | 25 | Change "$\Delta$ vref" to --$\Delta$vref--. |
| 7 | 56 | After "terminated" insert --,--. |
| 8 | 19 | Change "votlate" to --voltage--. |
| 9 | 54 | change "votlate" to --voltage--. |
| 9 | 64 | Change "Bv" to --Vb--. |
| 11 | 24 | Change "curreht" to --current--. |
| 12 | 15 | Change "imbax" to --Ibmax-- |
| 12 | 25 | Change "a is added" to --$\alpha$ is added--. |
| 12 | 55 | Before "may" insert --it--. |
| 12 | 65 | Change "computer" (second occurrence) to --program--. |
| 18 | 22 | After "source" change "." to --,--. |

Signed and Sealed this

Thirteenth Day of November, 2007

JON W. DUDAS
*Director of the United States Patent and Trademark Office*